United States Patent [19]

Rathsack

[11] 3,837,674
[45] Sept. 24, 1974

[54] TRAILER HITCH CONVERTER

[76] Inventor: Quintin J. Rathsack, Rt. 6, Box 153, Appleton, Wis. 54911

[22] Filed: Aug. 3, 1973

[21] Appl. No.: 385,624

[52] U.S. Cl............... 280/417, 280/511, 280/415 A
[51] Int. Cl............................................. B60d 1/06
[58] Field of Search............ 280/415 R, 415 A, 504, 280/417

[56] References Cited
UNITED STATES PATENTS

| | | | |
|---|---|---|---|
| 2,700,555 | 1/1955 | Arend | 280/504 |
| 2,827,307 | 3/1958 | Osborn | 280/504 X |
| 2,940,775 | 6/1960 | Farrow et al. | 280/415 A |
| 3,700,263 | 10/1972 | Day | 280/415 A |

FOREIGN PATENTS OR APPLICATIONS

| | | | |
|---|---|---|---|
| 1,016,570 | 9/1957 | Germany | 280/417 |

*Primary Examiner*—Leo Friaglia
*Attorney, Agent, or Firm*—Wheeler, Morsell, House & Fuller

[57] ABSTRACT

A pintle hook trailer hitch which includes a hook and a closure member is attached to the rear of a towing vehicle. The closure member is movably mounted over the eye of the hook for opening and closing the same. A converter for other hitch systems is attachable to the hook and comprises an elongated base plate, two side plates which are attached to opposite side edges of the base plate and a shaft which is attached between the two side plates, the shaft being dimensioned to fit in the eye of the hook, and the side plates being positioned to bear against opposite sides of the hook to prevent sidewise rotation of the base plate with respect to the hook. An abutment on the front end of the base plate bears against the bottom of the hook to prevent downward rotation of the base plate with respect to the hook. A rear plate is attached between the two rear edges of the side plates and constitutes an abutment bearing on the closure member to prevent upward rotation of the base plate with respect to the hook. The ball portion of a ball hitch is removably attached to the rear of the base plate through an opening in the base plate which is dimensioned to receive the pin of a pin and clevis hitch when the ball is removed from the base plate.

3 Claims, 4 Drawing Figures

PATENTED SEP 24 1974　　　3,837,674
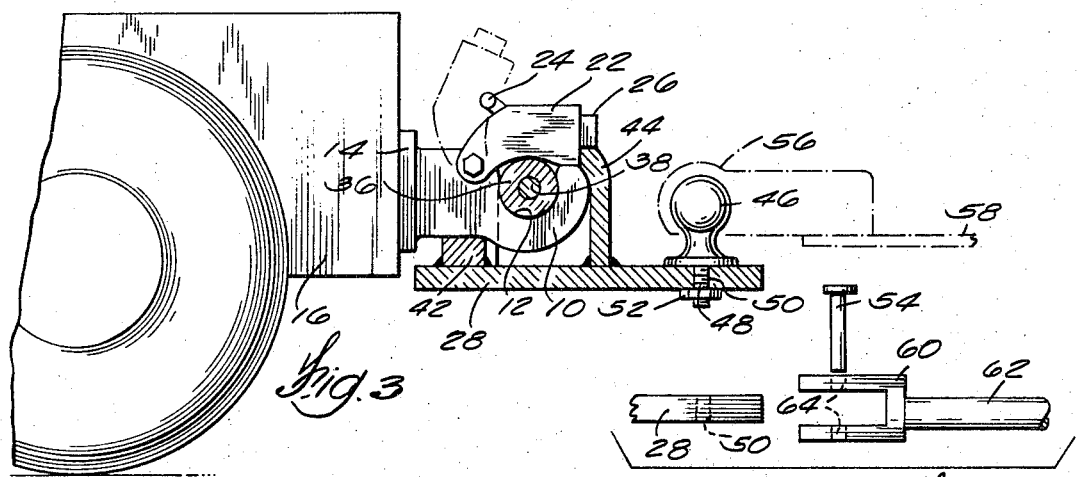
Fig. 3
Fig. 4
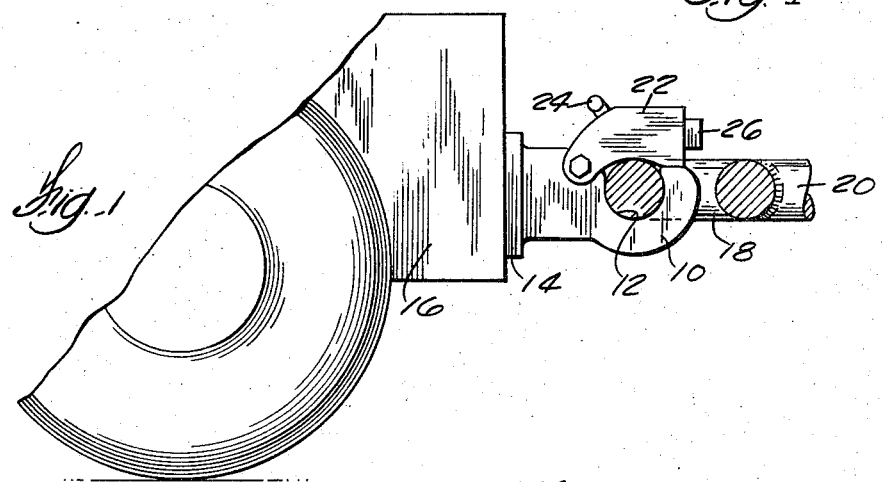
Fig. 1
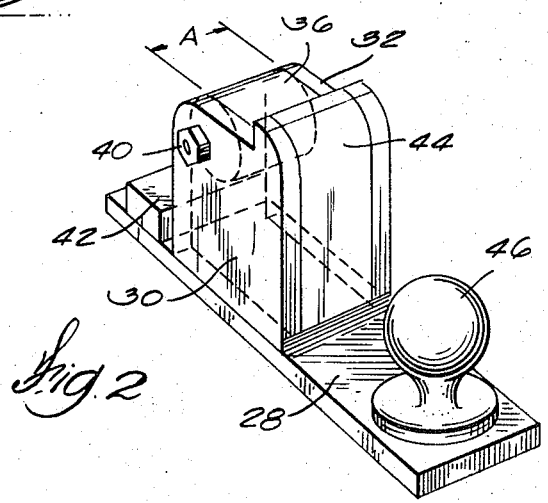
Fig. 2

TRAILER HITCH CONVERTER

BACKGROUND OF THE INVENTION

There are three different types of trailer hitches which are in common use today: (1) the pintle hook hitch; (2) the ball hitch; and (3) the pin and clevis hitch. In the pintle hook hitch, a hook attached to the rear of the towing vehicle engages a ring which is attached to the trailer tow bar. A closure member covers the eye of the hook and prevents the ring from disengaging from the hook. In the ball hitch, a ball attached to the rear of the towing vehicle is clamped in a ball socket on the trailer tow bar. In the pin and clevis hitch, a flat bar attached to the rear of the towing vehicle is pinned to a clevis on the trailer tow bar by means of a pin which passes through aligned openings in the bar and clevis.

In businesses which involve trailer towing, it is frequently necessary to have towing vehicles which are equipped to accommodate any one of the three different trailer hitches. In the past, this has been accomplished by mounting all three types of trailer hitches on the back end of the towing vehicles used in such businesses. This means needless duplication of hitches. Only one of the hitches can be on the center line of the vehicle where it ought to be for towing stability. Moreover, duplication of hitches is expensive because each hitch must be designed to properly transfer the forces involved to the towing vehicle. Finally, if a trailer is secured to a hitch which is off center, not only will the forces not be transferred correctly, but if the two vehicles involved are near the width limit of the Motor Vehicle Code in the place where the towing is done, the off center mounting can make the total width greater than that which is allowable.

A convertible trailer hitch has been designed in the past which can be changed from a pin and clevis hitch to a ball hitch, and vice versa, as disclosed in U.S. Pat. No. 2,812,956. But this convertible hitch cannot be used with pintle hook hitches, and accordingly a need exists to provide a convertible trailer hitch which can be used to provide all three different types of trailer hitch, with each providing proper and secure connection.

SUMMARY OF THE INVENTION

In accordance with this invention, the above-noted need is met by providing a trailer hitch converter for use in combination with a pintle hook trailer hitch which includes a hook attached to the rear of a towing vehicle and a closure member movably mounted over the eye of the hook for opening and closing the same. The converter includes an elongated base plate which has two side plates attached to opposite side edges thereof with a shaft attached between the two side plates, the shaft being dimensioned to fit in the eye of the hook, and the side plates being positioned to bear against opposite sides of the hook to prevent sidewise rotation of the base plate with respect to the hook. The front end of the base plate bears against the bottom of the hook to prevent downward rotation of the base plate with respect to the hook. A rear plate is attached between the two rear edges of the side plates and bears against an abutment on the pintle hook closure member to prevent upward and rearward rotation of the base plate with respect to the hook. The ball portion of a ball hitch is removably attached to the rear of the base plate through an opening in the base plate which is dimensioned to receive the pin of a pin and clevis hitch when the ball is removed from the base plate.

DESCRIPTION OF THE DRAWINGS

FIG. 1 is a side elevational view of a modified pintle hook trailer hitch mounted on the rear of a towing vehicle, with a towing ring engaged in the eye of the hook and retained therein by a closure member, with the eye shown broken away for clarity.

FIG. 2 is a perspective view of the trailer hitch converter of this invention, with the hitch ball in place.

FIG. 3 is a side elevational view of the trailer hitch converter of FIG. 2 mounted on a modified pintle hook trailer hitch, portions of the converter being cut away to expose interior details.

FIG. 4 is an exploded fragmentary detail view of the rear end of the trailer hitch converter of FIG. 3 with the ball removed to adapt the converter for use as a pin and clevis hitch.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The trailer hitch converter of this invention is designed to be used in combination with conventional pintle hook trailer hitches. FIG. 1 shows a modified pintle hook trailer hitch which includes a hook 10 having an eye 12, the hook 10 being rigidly attached to a mounting plate 14. Mounting plate 14 is attached to the rear of a towing vehicle 16 by welding or by other suitable attachment means which is sturdy enough to support the forces encountered in pulling a loaded trailer. Hook 10 is attached on the centerline of towing vehicle 16. In use the hook 10 is coupled to a ring 18 which is welded or otherwise secured to the end of a trailer tow bar 20. The ring 18 is retained within the eye 12 of hook 10 by means of a closure member 22 which is pivotally attached to the top of hook 10 over the open end of eye 12. Closure member 22 is movable between a closed position illustrated in solid lines and an open position illustrated in dashed lines. The closure member 22 may be latched in its closed position by a latching arm 24 to prevent the ring 18 from disengaging from hook 10. An abutment pad 26 is welded to the rear end of closure member 22 to modify it for purposes of this invention as will be explained hereinafter.

An embodiment of the trailer hitch converter of this invention is shown in FIG. 2. This embodiment includes a relatively elongated base plate 28 which has two side plates 30 and 32 welded to opposite sides thereof and extending upwardly therefrom. A shaft 36 is attached between the two side plates 30 and 32 by means of a bolt 38, which passes through openings in the side plates 30 and 32 and in shaft 36, and a nut 40, which engages one end of the bolt 38. Shaft 36 is dimensioned to fit snugly within hook 10 as shown in FIG. 3, and the side plates 30 and 32 are positioned so that they are separated by a distance A which is only slightly greater than the width of hook 10 so that side plates 30 and 32 will bear against the sides of hook 10 to prevent sidewise rotation of the base plate 28 with respect to hook 10. An abutment pad 42 is welded to base plate 28 forward of side plates 30 and 32 to hold base plate 28 level and to bear against the base of hook 10 and prevent downward rotation of base plate 28 with respect to hook 10. For the purposes of this document, downward rotation of base plate 28 is defined as clockwise rotation of base plate 28 around shaft 36 with respect to FIG. 3. Upward rotation of base plate 28 is defined as counterclockwise rotation of base plate 28 around shaft 36 with respect to FIG. 3. Upward rotation of base plate 28 is prevented by the abutment of abutment pad 26 and a rear plate 44 which is welded between the rear edges of the two side plates 30 and 32.

The ball portion 46 of a ball hitch is removable attached to the rear end of base plate 28 by means of a threaded stud 48 which extends through an opening 50 in base plate 28 and is secured by a nut 52. Ball 46 is dimensioned to fit within the socket of a ball hitch. The opening 50 is dimensioned to receive the pin 54 of a pin and clevis hitch when the ball 46 is removed from base plate 28 as shown in FIG. 4. Thus the trailer hitch converter of this invention may be changed from a ball hitch to a pin and clevis hitch by simply removing the ball 46, which is removably attached to the rear of base plate 28.

In the operation of this invention, if a pintle hook hitch is desired, the converter is removed from hook 10, which then can function as a pintle hook hitch as shown in FIG. 1, despite abutment 26. If a ball hitch is desired, the shaft 36 of the converter is inserted into the eye 12 of hook 10 and is clamped therein as shown in FIG. 3 with the ball 46 attached thereto. The ball 46 can then be engaged in a ball socket 56 which is attached to the front end of a trailer tow bar 58. In this configuration, the base plate 28 is prevented from rotating in response to the towing forces by the abutment pads 42, 26 and by the plates 30, 32, and 44 as described above. Thus the ball 46 is as firmly held in place as if it were rigidly attached to the rear of towing vehicle 14. If a pin and clevis hitch is desired, the ball 46 is removed and the rear end of base plate 28 will then receive a clevis 60 (see FIG. 4) which is attached to the end of a trailer tow bar 62. The clevis 60 has openings 64 for receiving the pin 54. The clevis openings 64 are aligned over the opening 50 is base plate 28 and pin 54 is passed through all three openings.

Although not shown herein, the pintle hook of my invention may be secured to the towing vehicle by a load equalizing device rather than being secured directly to the vehicle.

Thus it will be clear that the trailer hitch converter of this invention enables a pintle hook hitch to be easily converted into a ball hitch or a pin and clevis hitch, all three of the hitches being correctly located on the centerline of the towing vehicle, with a minimum of excess structure and movable parts.

I claim:

1. A trailer hitch converter for use in combination with a pintle hook trailer hitch which includes a hook, said trailer hitch converter comprising a relatively elongated base plate, means attached to said base plate for engaging the eye of said hook and securing said base plate to said hook, an opening near the rear end of said base plate of a size to receive the pin of a pin and clevis hitch, and a ball member having means for securing said ball member to the base plate, said ball member being dimensioned to fit within the socket of a ball trailer hitch, whereby said pintle hook trailer hitch may be converted to a pin and clevis trailer hitch or to a ball trailer hitch, said means for engaging said hook and securing said base plate to said hook comprising a pair of side plates attached to opposite sides of said base plate said side plates being spaced apart by a distance which is only slightly greater than the width of said hook whereby said side plates prevent sidewise rotation of said base plate with respect to said hook and a shaft attached between said side plates, said shaft being dimensioned to fit in the eye of said hook to secure said base plate to said hook and an abutment member on the upper side of said base plate positioned to contact the base of said hook to prevent said base plate from rotating downwardly with respect to said hook.

2. A trailer hitch converter for use in combination with a pintle hook trailer hitch which includes a hook, said trailer hitch converter comprising a relatively elongated base plate, means attached to said base plate for engaging the eye of said hook and securing said base plate to said hook, said means comprising side plates spaced apart by a distance which is only slightly greater than the width of said hook whereby said side plates prevent sidewise rotation of said base plate with respect to said hook, an opening near the rear end of said base plate of a size to receive the pin of a pin and clevis hitch, and a ball member having a threaded stud attached thereto, said ball member being dimensioned to fit within the socket of a ball trailer hitch, said threaded stud being dimensioned to extend through said opening in said base plate to receive a nut for securing said ball to said base plate, whereby said pintle hook trailer hitch may be converted to a pin and clevis trailer hitch or to a ball trailer hitch, further comprising an abutment member on the upper side of said base plate positioned to contact the base of said hook to prevent said base plate from rotating downwardly with respect to said hook.

3. The trailer hitch converter defined in claim 1 and further comprising a closure member for opening and closing the eye of said hook, a rear plate attached between the rear edges of said two side plates, and an abutment member mounted on said closure member and positioned to engage the upper end of said rear plate to prevent said base plate from rotating upwardly with respect to said hook.

* * * * *